Patented Mar. 27, 1928.

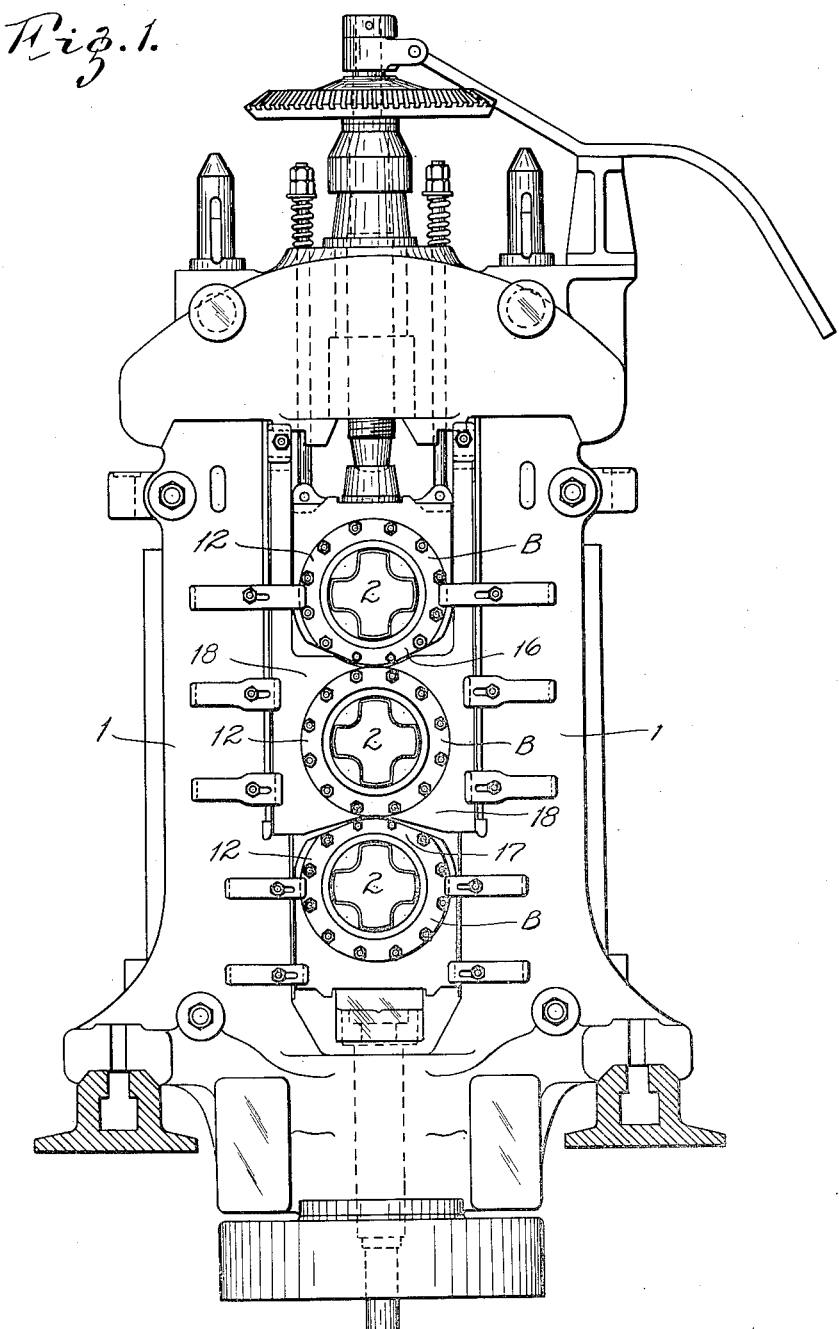

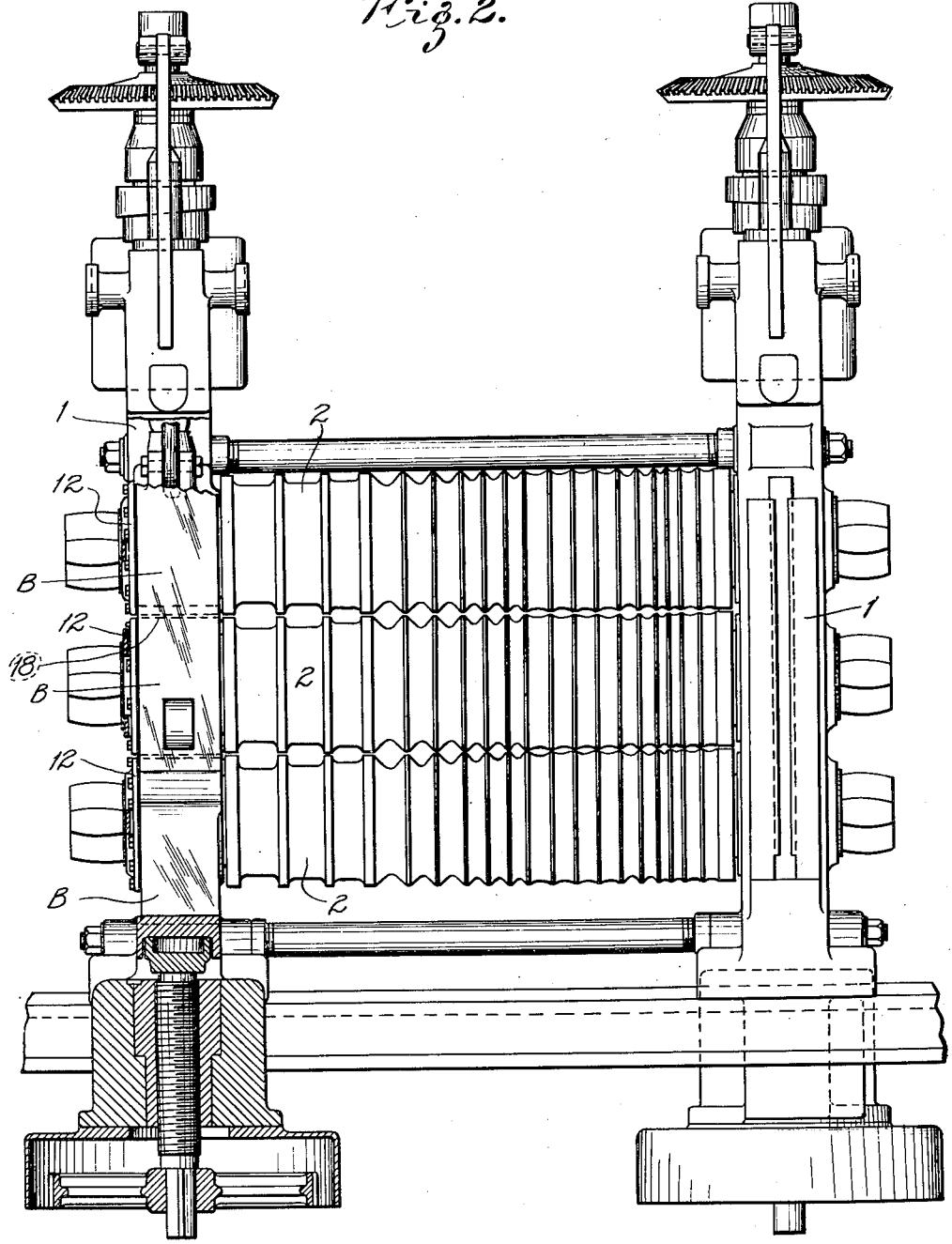

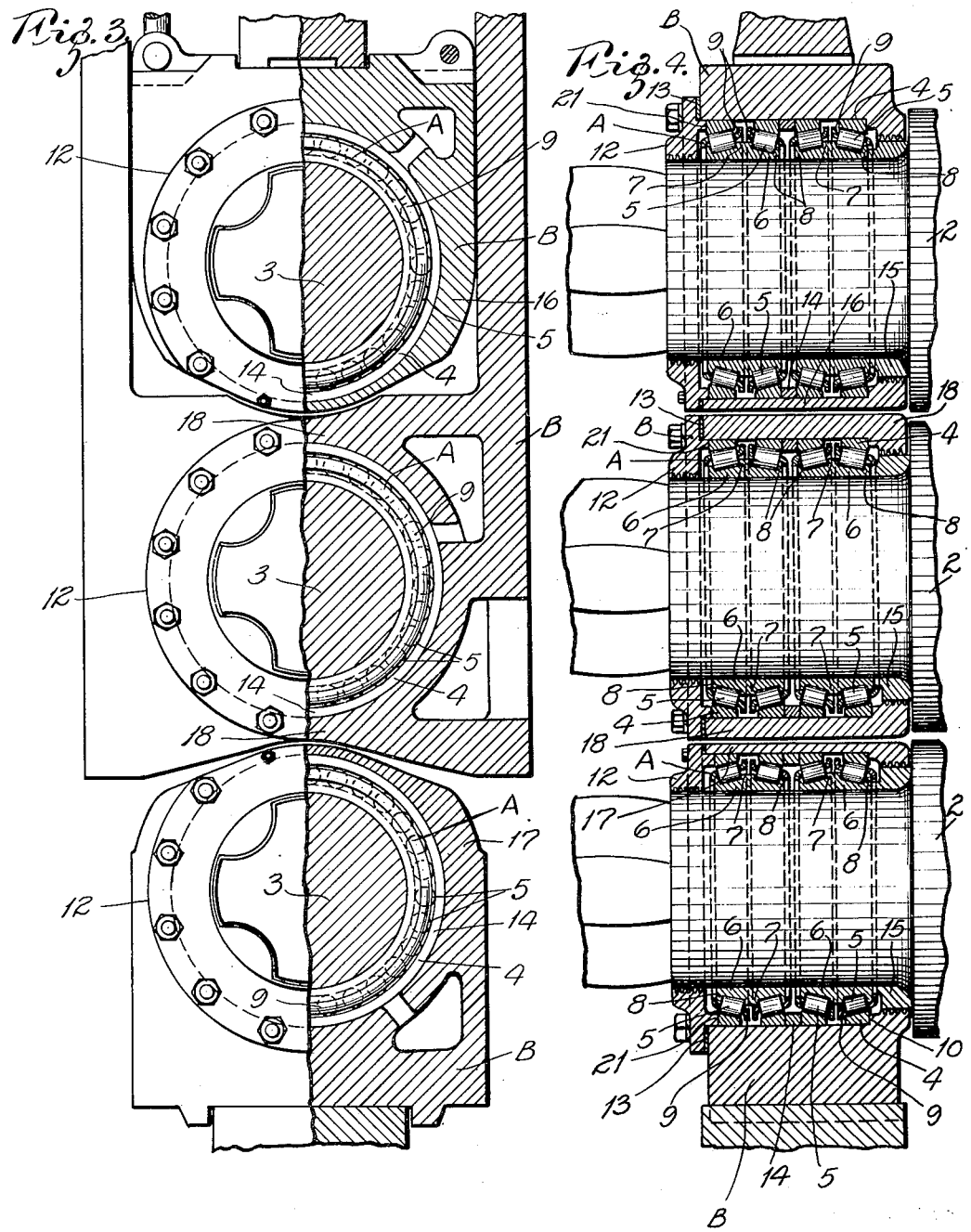

1,664,141

UNITED STATES PATENT OFFICE.

JONAH HOWELL VAN CAMPEN, OF CANTON, OHIO, ASSIGNOR TO THE TIMKEN ROLLER BEARING COMPANY, OF CANTON, OHIO, A CORPORATION OF OHIO.

ROLLING MILL.

Application filed April 16, 1926. Serial No. 102,440.

My invention relates to rolling mills, particularly mills of the kind known as "three-high" mills. The principal object of the invention is to provide for the use of roller bearings for the rolls thereof. The invention consists principally in adapting the housings for the roller bearings so that the same can be accommodated in vertical alinement in the limits of space imposed by the other practical requirements of the mill. It also consists in the combinations and arrangements of parts hereinafter described and claimed.

In the accompanying drawing, wherein like reference numerals refer to like parts wherever they occur, Fig. 1 is an end elevation of a three-high mill embodying my invention;

Fig. 2 is a side view of such mill with a part shown in section and with a part of one end frame broken away to show the devices that secure the top housing;

Fig. 3 is a detailed view illustrating the mounting of the rolls, being partly an end elevation and partly a vertical section; and Fig. 4 is a detailed view in vertical section through the roller bearings and housings.

When a billet or the like passes through a rolling mill, the rolls thereof are subjected to high stresses that tend to spread them apart; and this circumstance necessitates that the necks of the rolls and the bearings therefor and their housings shall be large and strong enough to take care of the stresses thereon. Accordingly, any increase in the diameter of the necks of the rolls would reduce by that much the space available for the housings and bearings of the rolls; and likewise, any increase in the space allotted to the housings and bearings could be gained only by decreasing the diameter of the necks of the rolls. To obviate this difficulty, it has been proposed to offset the bearings of the middle roll longitudinally with relation to the bearings of the top and bottom rolls; but this arrangement sacrifices the great advantages of vertical alinement and has the great disadvantage of increasing the span or distance between the bearing at one end of a roll and the bearing at the other end thereof. For these reasons, it has heretofore been considered impracticable to equip such rolls with roller bearings even in the case of new mills; whereas my invention provides not only for the use of roller bearings in new mills but for their application to old mills also. The present mill comprises a framework 1 and rolls 2 of common type; but instead of the usual journal bearings and their housings, the necks 3 of the rolls are provided with roller bearings A whose cups 4 are contained in housings removably and adjustably mounted in the said frames 1 and specially designed to permit of their vertical alinement within the space available therefor.

In order to keep the overall diameter of the bearings A within the limits practically available therefor and still enable such bearings to stand the radial and endwise stresses to which it will be subject, taper rollers 5 are used and arranged in a multiplicity of circular series. In the construction illustrated, there are four circular series of taper rollers 5 on each neck 3 of each roll 2. The four series of rollers are arranged in two groups of two series each; and the inner bearing member 6 of each group is made in the form of a ring with an annular thrust rib 7 at the middle of its outer surface. From this thrust rib 7, said inner bearing member 6 tapers toward its ends, which are also preferably provided with thrust ribs 8. Cages 9 are preferably used for spacing the rollers 5 apart; and each series of rollers has its own cup 4 suitably provided therefor in the housing. The endmost cups 4 bear respectively against a shoulder 10 provided therefor in the housing 5 and against a rib 4 provided therefor on a collar 12 that is bolted to the housing B with suitable washers 13 or adjusting shims interposed between said collar 12 and said cup 4. By thus using a multiplicity of series of rollers 5, the stresses thereon are distributed and it becomes practicable to use rollers of smaller diameter than would otherwise be practicable, and thus the overall diameter of the bearing is kept within available limits. Preferably spacer rings 14 are interposed between the middle cups 4 and on the neck 3 of each roll 2 is preferably mounted a ring 15 that constitutes an abutment for the adjacent inner bearing member 6.

As stated above, the passing of the billet between the rolls 2 occasions great stresses upon such rolls, which must be taken care of by the necks of the rolls and their bearings A and the housings B therefor; but it is noted that the great stresses on the top roll 2 are upwardly and the great stresses on the bottom roll 2 are downwardly, the downward stresses on the top roll and the upward stresses on the bottom roll being relatively unimportant. Taking advantage of these facts, the lower part of the housing 16 of the top roll 2 and the upper part of the housing 17 of the lower roll, consistently with the reduced stresses thereon, are reduced in vertical thickness relatively to the diametrically opposite portions. By thus reducing the portions of the top and bottom housings adjacent to the housing 18 of the middle roll, the three housings can be placed in vertical alinement in the end frames of the mill without having to reduce the diameters of the necks 3 of the rolls 2 and with ample space for the roller bearings A therein and adequate provision for the usual clearance required for the adjustment of the rolls.

By reason of the vertical compactness of the bearings and the relative thinness of the portion of the housings of the top and bottom rolls adjacent to the middle roll, it becomes feasible to apply roller bearings to old mills without having to alter either the framework thereof or the rolls thereof, simply by replacing the old journals and their housings with roller bearings and housings designed after the manner hereinbefore described.

What I claim is:

1. A three-high rolling mill comprising end frames, vertically alined roll housings in said end frames, and roller bearings comprising inner and outer raceway members and rollers therebetween interposed between the necks of the rolls and said housings, the portions of the top and bottom housings adjacent to the middle roll being thinner than the portions thereof away from said roll to enable said housings to be mounted in vertical alinement.

2. A rolling mill comprising end frames, vertically alined roll housings in said end frames and roller bearings comprising inner and outer raceway members and rollers therebetween interposed between the necks of the rolls and said housings, the aggregate thickness of the adjacent portions of said housings being less than the aggregate thickness of the diametrically opposite portions.

3. A three-high rolling mill comprising end frames, vertically alined roll housings in said frames, rolls having their ends mounted in said housings, and roller bearings interposed between the necks of the rolls and said housings, the upper and lower housings being of reduced thickness adjacent to the middle housing to permit said housings to be mounted in vertical alinement.

4. A three-high rolling mill comprising end frames, vertically alined roll housings in said frames, rolls having their ends mounted in said housings, and roller bearings interposed between the necks of the rolls and said housings, each bearing comprising a multiplicity of series of conical rollers, and the upper and lower housings being of reduced thickness adjacent to the middle housing.

Signed at Canton, Ohio, this 10th day of April, 1926.

JONAH HOWELL VAN CAMPEN.